United States Patent [19]

Kinoshita

[11] Patent Number: 4,559,434
[45] Date of Patent: Dec. 17, 1985

[54] WIRE-CUT ELECTRIC DISCHARGE MACHINING METHOD USING STORED MACHINING INSTRUCTIONS

[75] Inventor: Mitsuo Kinoshita, Hachioji, Japan

[73] Assignee: Fanuc Ltd, Minamitsuru, Japan

[21] Appl. No.: 449,666

[22] Filed: Dec. 14, 1982

[30] Foreign Application Priority Data

Dec. 17, 1981 [JP] Japan .................. 56-204175

[51] Int. Cl.⁴ .............................................. B23P 1/08
[52] U.S. Cl. .............................. 219/69 M; 219/69 C; 219/69 W
[58] Field of Search ............... 219/69 C, 69 G, 69 W, 219/69 M

[56] References Cited

U.S. PATENT DOCUMENTS

| 4,078,163 | 3/1978 | Bell, Jr. et al. | 219/69 W |
| 4,335,436 | 6/1982 | Inoue | 219/69 G |
| 4,383,160 | 5/1983 | Obara | 219/69 W |
| 4,392,041 | 7/1983 | Yatomi et al. | 219/69 W |

FOREIGN PATENT DOCUMENTS 0013096  1/1979  Japan ................. 219/69 W

OTHER PUBLICATIONS

Patent Abstracts of Japan, vol. 4, No. 164, Nov. 14, 1980, p. 16M41 & JP-A-55-112727.
Patent Abstracts of Japan, vol. 2, No. 138, Nov. 16, 1978, p. 4549M78 & JP-A-53-106994.
VDI-Zeitschrift, vol. 120, No. 15/16, Aug. 1978, VDI--Verlag.

Primary Examiner—Philip H. Leung
Attorney, Agent, or Firm—Staas & Halsey

[57] ABSTRACT

A method of electric discharge machining using a wire electrode for cutting a workpiece into a commanded shape by producing an electric discharge between the workpiece and the wire electrode and moving the wire electrode relative to the workpiece along a commanded path. The method includes steps of previously storing, in a computer memory, sets of machining conditions which differ depending upon workpiece material and thickness, reading, at the time the workpiece is to be machined, a predetermined set of the machining conditions from the memory in response to a machining condition selection instruction in a machining program and performing electric discharge machining in accordance with the set of machining conditions read from the memory.

12 Claims, 6 Drawing Figures

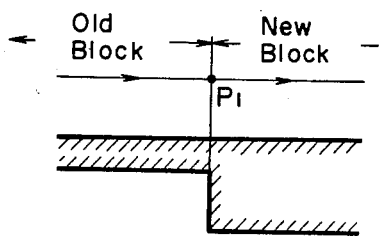
Fig. 2A
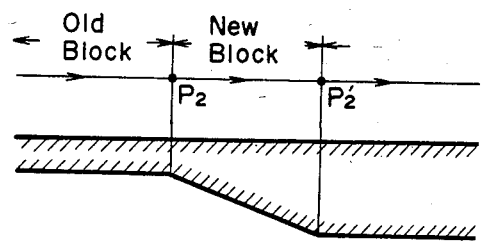
Fig. 2B
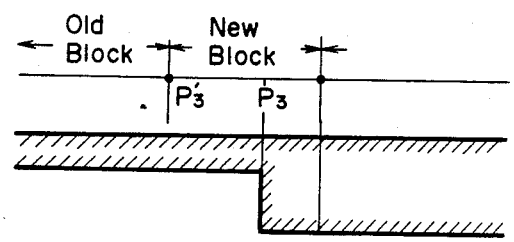
Fig. 2C
Fig. 3
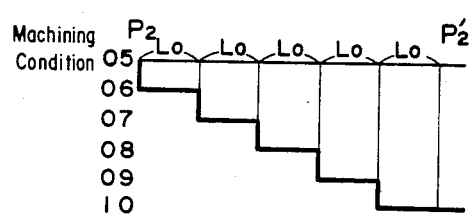
Fig. 4
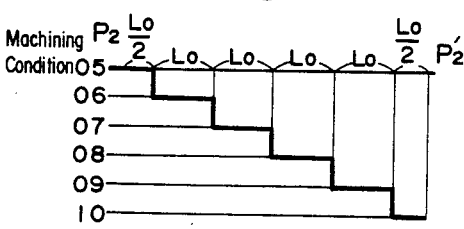

WIRE-CUT ELECTRIC DISCHARGE MACHINING METHOD USING STORED MACHINING INSTRUCTIONS

BACKGROUND OF THE INVENTION

This invention relates to an electric discharge machining method using an electric discharge machine of the type that cuts a workpiece by means of a wire electrode, or a so-called "wire-cut" electric discharge machine. More particularly, the invention relates to a wire-cut electric discharge machining method wherein sets of machining conditions are stored beforehand in a computer memory, one of the sets is issued as a command in response to a machining program, and a workpiece is cut by the wire electrode based on the commanded set of machining conditions.

In a wire-cut electric discharge machine, a voltage differential is established between the travelling wire electrode and a workpiece to produce an electrical discharge or spark across the intervening gap. Relative movement is established between the workpiece and the wire electrode on the basis of machining command data while the electrical discharge erodes the workpiece in small increments, thereby cutting a workpiece into the desired shape. In an electric discharge machine of this type, machining conditions change depending upon the nature and thickness of the workpiece material and the diameter of the wire electrode. Such conditions include the voltage impressed across the gap between the electrode and workpiece, the resulting peak current and average current magnitudes, the capacitance of the discharge circuit, the duty (on-off time) of the voltage pulses applied to the gap, the wire electrode tension, servo voltage, and the specific resistance of the machining fluid (dielectric) introduced into the gap. The operator must therefore take into consideration the thickness and properties of the workpiece as well as the electrode diameter and set the optimum machining conditions on an associated numerical control device prior to the start of cutting. The wire-cut electric discharge machining operation may then proceed on the basis of the set conditions.

Another important factor in electric discharge machining is that the thickness of a workpiece is not always uniform. When such is the case, it is necessary to change the machining conditions in accordance with the change in thickness. With the conventional wire-cut electric discharge machine, however, only one set of machining conditions can be set on the operator's panel. In order to changeover from one set of conditions to another set in accordance with workpiece thickness, therefore, the operator must monitor the change in thickness and, whenever a change is noted, must manually set, the proper values for impressed voltage, peak current, pulse duty cycle and wire electrode tension, etc. This is an extremely laborious task and makes unattended operation impossible to achieve unattended operation. Though it is feasible to adopt an arrangement wherein more than one set of machining conditions may be set on the operator's panel at the same time, this would entail a multiplicity of different switches and lead to an apparatus of larger size and higher cost.

SUMMARY OF THE INVENTION

Accordingly, an object of the present invention is to provide a novel wire-cut electric discharge machining method wherein machining conditions can be changed during machining through a simple and inexpensive arrangement.

Another object of the present invention is to provide a wire-cut electric discharge machining method wherein machining of a workpiece can proceed while machining conditions are changed to deal with any variation in workpiece thickness encountered during machining.

Still another object of the present invention is to provide a wire-cut electric discharge machining method wherein any variation in workpiece thickness encountered during machining is sensed and machining conditions are changed to accommodate the variation in thickness.

These and other objects of the present invention are attained by providing a wire-cut electric discharge machining method which includes steps of previously storing, in a computer memory, sets of different machining conditions based on workpiece material and thickness, reading from the memory a predetermined set of the machining conditions in response to a machining condition selection instruction inserted in a machining program at the time that the workpiece is to be machined, and performing electric discharge machining in accordance with the set of machining conditions read from the memory.

Other features and advantages of the invention will be apparent from the following description taken in conjunction with the accompanying drawings.

BRIEF DESCRIPTION OF THE DRAWINGS

FIGS. 2A, 2B and 2C are diagrams illustrating changes in workpiece thickness; and FIGS. 3 and 4 are diagrams illustrating how machining conditions are changed during machining for a case where workpiece thickness increases in a gradual manner.

DESCRIPTION OF THE PREFERRED EMBODIMENT

Figure 1:
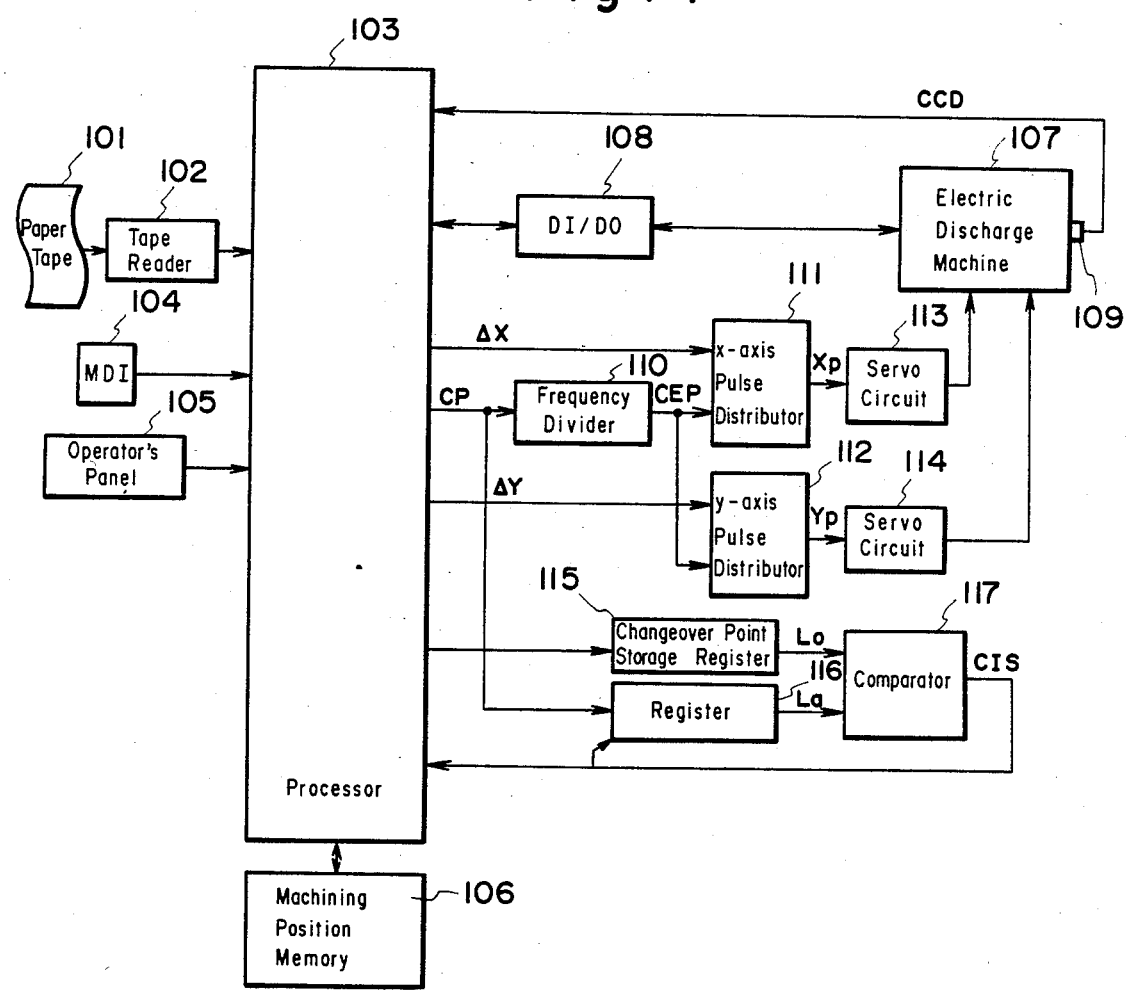
FIG. 1 is block diagram of an arrangement for practicing the method of the present invention.

Referring to FIG. 1, an arrangement for practicing the electric discharge machining method of the present invention includes a tape reader 102 for reading in a machining program (numerical control (NC) data) from a paper tape 101 bearing the data in punched form. The machining program is composed of data describing position and machining path, M-function instruction data and instructions inserted at proper locations for selecting electric discharge machining conditions. A machining condition selection instruction is expressed by the letter S followed by a numerical value of three digits. The leftmost digit indicates the machining condition change mode, while the two remaining digits refer to a predetermined machining condition to be selected from among a plurality of machining conditions stored in a machining condition memory, described below.

First, second and third machining condition change modes are available. These are indicated by numerical values 1, 2 and 3, respectively, found in the leftmost of the three digits. When a first-mode machining condition selection instruction is issued, there is an immediate change in machining condition. In the second mode, machining conditions change in a step-wise manner.

When a third-mode machining condition selection instruction is issued, there is no immediate alteration in machining condition. Instead, the machining condition changes at the instant there is a change in the state of the electric discharge cutting operation.

FIGS. 2A, 2B and 2C show how a change in the thickness of a workpiece is accommodated. The workpiece illustrated in FIG. 2A has a thickness which changes abruptly at a point P1, the coordinates of which are known. When the wire electrode, moving relative to the workpiece, reaches the point P1, machining conditions will change immediately at the point P1 upon issuance of the first-mode machining condition selection instruction. The workpiece shown in FIG. 2B has a gradually changing thickness beginning at point P2, whose coordinates are known. When the wire electorde reaches the point P2, machining conditions will change in stages starting at point P2 upon issuance of the second-mode machining condition selection instruction. The workpiece shown in FIG. 2C has a thickness which changes abruptly at point P3, whose coordinates are unknown. When the wire electrode reaches a position P3' short of point P3, the third-mode machining condition selection instruction is issued in a new block. Then, when the wire electrode arrives at point P3, the resulting change in machining state, caused by the change in workpiece thickness, gives rise to a change in the machining conditions.

Returning to FIG. 1, the data read by the tape reader 102 is supplied to a processor 103. When a move command is read, the processor performs an arithmetic operation to compute incremental values $\Delta X$ and $\Delta Y$, which are applied to X-axis and Y-axis pulse distributors 111 and 112, respectively. The processor 103 also generates a pulse train CP having a frequency f which corresponds to a commanded speed (linear velocity). The processor 103 includes an internal memory (not shown) in which the incremental values $\Delta X$ and $\Delta Y$ are stored as quantities Xr and Yr indicating movement, along the X and Y axes, remaining in a block. The pulse distributors 111 and 112 generate pulses Xp and Yp in response to the incremental values $\Delta X$ and $\Delta Y$ input thereto. As each pulse is generated, the processor 103 performs the arithmetic operations:

$$Xr - 1 \rightarrow Xr, \quad Yr - 1 \rightarrow Yr \tag{1}$$

thereby monitoring the amount of movement remaining along the X and Y axes. When the conditions Xr=0 and Yr=0 are established, the processor 103 generates an internal pulse distribution end signal in response to which generation of the pulse train CP is terminated. The processor 103 also causes the tape reader 102 to read the move command of the next block from the paper tape 101. The processor 103 also executes registration processing wherein machining conditions entered by a manual data input (MDI) unit, described below, or machining conditions set on an operator's panel, are stored in an internal, non-volatile machining condition memory 106. The processor 103 also performs machining condition change processing for changing machining conditions when a machining condition selection instruction is read in from the paper tape 101.

The manual data input (MDI) unit 104, mentioned above, is provided for entering blocks of numerical control data or electric discharge machining conditions. The operator's panel 105 is provided with switches and meters for setting machining conditions such as applied voltage, peak current, electric discharge circuit capacitance, duty cycle of the pulsed voltage applied to the gap between the wire electrode and workpiece, tension applied to the wire electrode, and servo voltage. The above-mentioned non-volatile memory 106 stores the machining conditions input on the MDI 104 or set by the operator's panel 105.

A wire-cut electric discharge machine 107 includes a mechanism for feeding a wire as the wire electrode is worn down a mechanism providing relative movement between the wire electrode and a workpiece, a power supply providing the voltage impressed across the wire electrode and workpiece, a device for controlling the power supply, and a device for supplying a machining fluid to the site at which machining takes place. A data input/output unit 108 administers the exchange of digital data between the electric discharge machine 107 and the processor 103. The electric discharge machine 107 is provided with a sensor 109 for sensing a change in the state of machining. The sensor 109 does this by monitoring discharge current or servo voltage, producing a signal CCD when a change in state is detected. The signal CCD is supplied to the processor 103.

The pulse train CP of frequency f produced by the processor 103 is supplied to a frequency divider 110 for dividing the signal frequency by $\sqrt{\Delta X^2 + \Delta Y^2}$. The resulting pulse train signal CEP is applied to X- and Y-axis pulse distributors 111 and 112 serving as digital differential analyzers. More specifically, though not shown in the drawings, each of the pulse distributors 111 and 112 includes a register into which the incremental value $\Delta X$ or $\Delta Y$ is loaded, an accumulator, and an adder for adding the incremental value $\Delta X$ or $\Delta Y$, stored in the corresponding register, to the content of the corresponding accumulator each time the frequency divider 110 produces one of the pulses CEP. Within each pulse distributor, an overflow pulse produced by the accumulator emerges from the corresponding pulse distributor as an output pulse, or distributed pulse, Xp or Yp. The pulses Xp and Yp are applied to respective X-axis and Y-axis servo circuits 113 and 114 for driving X-axis and Y-axis motors, respectively. These move the wire electrode relative to the workpiece along the commanded cutting path.

It should be noted that the distributed pulses Xp and Yp have pulse rates $F_X$ and $F_Y$ respectively given by the following:

$$\left. \begin{array}{l} F_X = \dfrac{f \cdot \Delta X}{\sqrt{\Delta X^2 + \Delta Y^2}} \\[2mm] F_Y = \dfrac{f \cdot \Delta Y}{\sqrt{\Delta X^2 + \Delta Y^2}} \end{array} \right\} \tag{2}$$

Accordingly, the relative speed F between the wire electrode and workpiece may be written:

$$\begin{aligned} F &= \sqrt{F_X^2 + F_Y^2} \\ &= f \end{aligned} \tag{3}$$

This coincides with the correctly commanded speed (linear velocity).

When the second-mode machining condition selection instruction is read from the paper tape 101, the processor 103 computes the distance between machining condition change points, namely the changeover travelling distance $L_o$ between these points, and stores the result in the changeover point storage register 115. The travelling distance $L_o$ between the machining condition changeover points is computed in the following manner:

(a) Machining conditions for a plurality of stages forming a block of sets of machining conditions are consecutively stored beforehand in the machining condition memory 106;

(b) A difference n is found, in accordance with the following equation, between a stage (number) $N_o$ for an old set of machining conditions and a stage (number) $N_n$ for a new set of machining conditions based on a machining condition selection instruction:

$$n = N_n - N_o \quad (4)$$

(c) By using the abovementioned X- and Y-axis incremental values $\Delta X$ and $\Delta Y$, respectively a travelling distance L in the currently prevailing block is obtained from:

$$L = \sqrt{(\Delta X)^2 + (\Delta Y)^2} \quad (5)$$

(d) The changeover travelling distance $L_o$ between the machining condition changeover points is obtained from:

$$L_o = L/n \quad (6)$$

and, is stored in the changeover point storage register 115.

Also provided is a register 116 which, in the second mode, counts the pulses CP obtained from the processor 103, thereby storing a travelling distance $L_a$. This travelling distance $L_a$ and the changeover travelling distance $L_o$ from the register 115 are compared by a comparator 117 which, when coincidence between them is sensed, produces a coincidence signal CIS for resetting the register 116 to zero.

Figure 5:
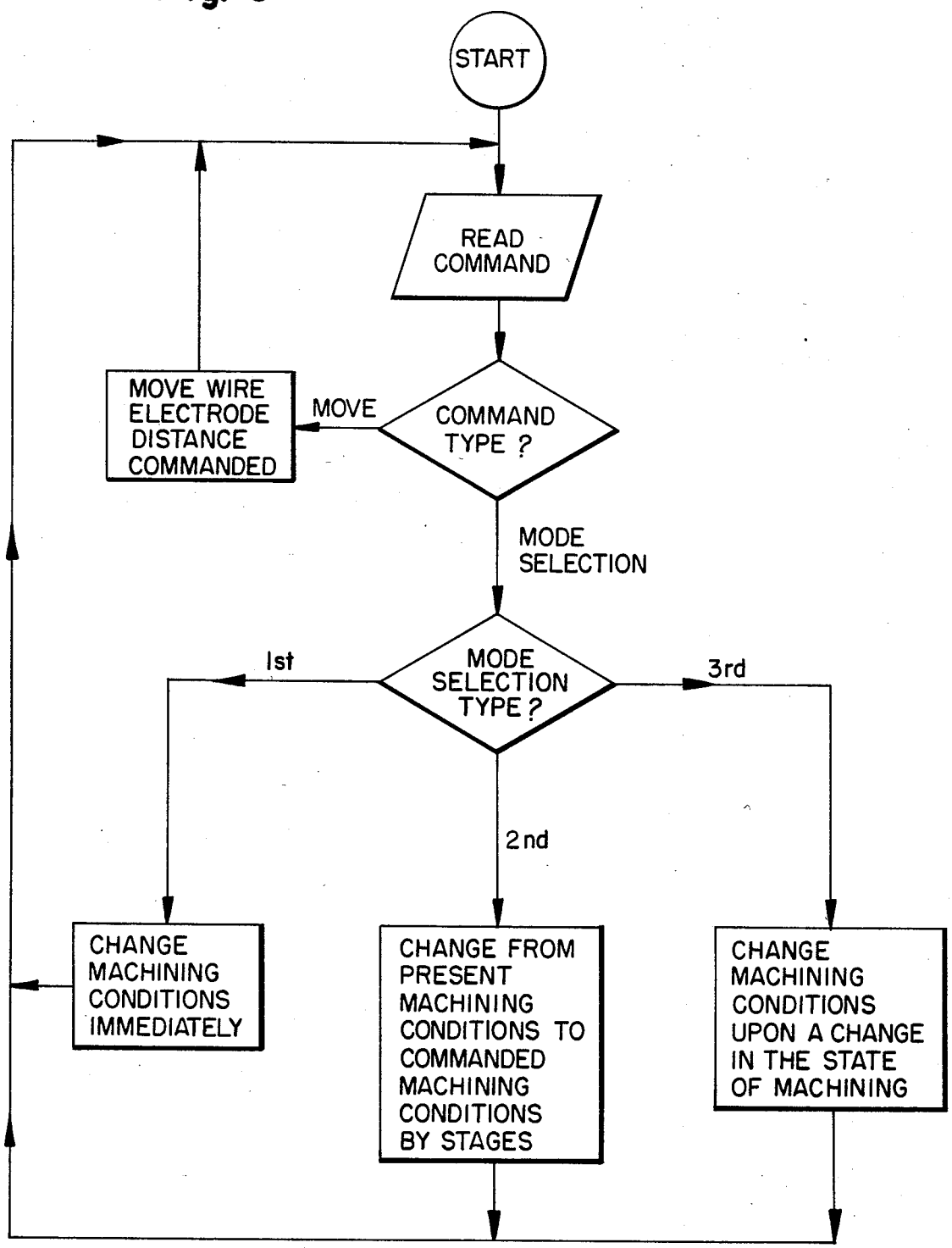
FIG. 5 is a flowchart setting for the method steps of the invention.

Referring to the flowchart shown in FIG. 5, the operation of the invention is described. In operation, plural sets of machining conditions are entered by means of the MDI 104 or operator's panel 105 and are registered in the machining condition memory 106. The machining conditions in each set include the applied voltage, peak current, discharge circuit capacitance, pulse duty cycle, wire electrode tension and servo voltage. For defining sets of machining conditions based on workpiece thickness, it will be assumed that the numerical values of the two digits which specify the sets of machining conditions grow successively larger with an increase in the thickness of the workpiece. Thus, sets of machining conditions corresponding to respective machining condition specifying numbers ranging from 01 to 99 are stored in the machining condition memory 106. As the two-digit number specifying machining conditions grows larger, therefore, this indicates that the conditions are changing to accommodate electric discharge machining applied to a workpiece of an increasing thickness.

After the sets of machining conditions are registered in the memory 106, a start button is depressed to cause NC data to be input to the processor 103 from the paper tape 101 via the tape reader 102. If the data read indicates a first-mode machining condition selection instruction S100, then the processor 103 immediately selects, from the machining condition memory 106, the set of machining conditions indicated by the two rightmost digits of said instruction. These machining conditions are supplied to the electric discharge machine 107 through the data input/output unit 108 to set the machine to the proper conditions. When the setting operation is completed, the electric discharge machine 107 sends a signal indicative of this fact to the processor 103 through the data input/output unit 108. The processor 103 responds by actuating the tape reader 102 to read NC data from the paper tape 101. If the data read is positional data, then the processor 103 computes the incremental values $\Delta X$ and $\Delta Y$, applies these values to the pulse distributors 111 and 112, respectively, produces the pulse train CP having frequency f and applies the pulse train to the frequency divider circuit 110. The latter produces the pulse train CEP having frequency $f/\sqrt{\Delta X^2 + \Delta Y^2}$ and applies the pulse train CEP to each of the adders (not shown) in the corresponding pulse distributors 111 and 112. As a result, the pulse distributors 111, 112 execute arithmetic pulse distributing operations, producing the distributed pulses Xp and Yp which are applied to the servo circuits 113 and 114, for driving X- and Y-axis motors, respectively. The motors transport the wire electrode relative to the workpiece. The distributed pulses Xp and Yp also enter the processor 103 which executes the arithmetic operations of Eq. (1) each time the pulses Xp and Yp are generated. When the amount of remaining movement reaches zero, the processor 103 generates the internal pulse distribution end signal, thereby halting the generation of the pulse train CP and reading in the next block of NC data from the paper tape 101.

Referring to FIG. 2A, assume that the wire electrode cuts a workpiece up to the point P1, of known coordinates, at which point (i.e., starting from the next block of data) an increase in workpiece thickness is encountered. In the machining program stored on the paper tape 101, a first-mode machining condition sleection instruction will be found following the machining path data leading up to point P1. For example, it will be assumed that the machining condition number specifying the set of machining conditions from point P1 onward is the number 10. Thus, S110 will be the machining condition selection instruction inserted after the path data leading up to point P1. When the signal indicative of instruction S110 is input to the processor 103, the latter immediately retrieves from the machining condition memory 106 the set of machining conditions specified by the rightmost two digits 10. The set of conditions is then supplied to the electric discharge machine 107 through the input/output unit 108. In response, the electric discharge machine 107 automatically changes such conditions as the applied voltage, peak current magnitude and pulse duty cycle on the basis of the conditions specified by the input two-digit number 10. Electric discharge machining thenceforth is performed based on the new conditions.

In a case where workpiece thickness changes abruptly at a point P3 having coordinates which are unknown, as illustrated in FIG. 3C, a third-mode machining condition selection instruction, such as S310, will be found inserted in the machining program after path data leading up to a point P3' which precedes the point P3. Path data for a new block is inserted in the machining program following said selection instruction S310. When the selection instruction S310 enters the processor 103, the processor 103 is placed in an operating mode based on the third-mode machining selection instruction but does not yet read the set of machining conditions specified by the two-digit number 10 stored in memory 106 and, hence, does not deliver this set of conditions to the electric discharge machine 107 at this time. Next, after the new block of path data is read by the tape reader 102, the wire electrode is transported relative to the workpiece along the commanded path to cut the workpiece. When the wire electrode arrives at point P3, a change in the state of machining is encountered and results in a greater discharge current. This is sensed by the sensor 109 which responds by producing the signal CCD which is supplied to the processor 103. The latter responds in turn by immediately reading, from the memory 106, the set of machining conditions specified by the two rightmost digits of the machining condition selection instruction S310. This set of machining conditions is applied to the electric discharge machine 107 through the input/output unit 108. As a result, the machine 107 automatically changes the machining conditions such as the applied voltage, peak current and pulse duty cycle based on the input set of machining conditions. From this point onward electric discharge machining is executed based on the new conditions.

When the wire electrode cuts the workpiece illustrated in FIG. 2B and arrives at the point P2, having known coordinates, the workpiece thickness will gradually increase in the next block. In the machining program, a second-mode machining condition will be found inserted after the path data leading up to point P2. Assuming that the number indicating the set of machining conditions for maximum thickness in the new block is the number 10, the machining condition selection instruction will be S210. When a signal indicating this instruction is input to the processor 103, the latter performs the arithmetic operation of Eq. (4). If we assume that 05 is the number of the old set of machining conditions, then the processor 103 performs the operation $n = 10 - 5 = 5$ from Eq. (4).

Thereafter the processor 103 performs the operation of Eq. (5) based on more data for the new block to compute the travelling distance L in the new block and, using n and L, obtains the changeover travelling distance $L_o$ from Eq. (6), this then being stored in the changeover point storage register 115. The processor 103 subsequently reads, first, the set of machining conditions specified by the machining condition number 06 in order to replace the old set of machining conditions. This new set of machining conditions is read from the machining condition memory 106 and is applied to the electric discharge machine 107. Accordingly, the electric discharge machine 107 automatically changes the values of the applied voltage, peak current, pulse duty cycle, etc., to 06 values specified by the set of machining conditions. The electric discharge machine 107 thereafter cuts the workpiece on the basis of various sets of machining conditions, one set giving way to another each time a new changeover point is reached in the course of machining.

More specifically, as the wire electrode is moved relative to the workpiece along the commanded path of the new block in the second mode, the pulses CP, generated by the processor 103, are input to the register 116 and increment its content La. When La becomes equivalent to the changeover or one-stage travelling distance Lo in register 115, the comparator 117 applies the coincidence signal CIS to the processor 103 and resets the content of register 116 to zero at the same time. In response to the signal CIS, the processor 103 reads out the set of machining conditions specified by the machining condition number 07 and applies this set of conditions to the electric discharge machine 107, so that the workpiece will be cut based thereon until the next machining condition changeover point is reached. Thereafter, and in like fashion, sets of machining conditions specified by 08, 09 and 10 are read out of the memory 106 and applied to the electric discharge machine 107 in the stated order each time the wire electrode moves a distance $L_o$ relative to the workpiece. The machining conditions thus change in stages in accordance with the progress of the cutting operation. This procedure is illustrated in FIG. 3, wherein the machining condition number changes from 05 to 10 in stages in accordance with the progress of machining, in the case of second-mode machining condition selection.

In the example of FIG. 3 described above, the set of machining conditions is changed to that specified by the number 06 at the beginning of the new block. As illustrated in FIG. 4, another arrangement is possible wherein the change to the set of machining conditions specified by number 06 occurs at a position $L_o/2$ beyond the beginning of the new block, after which the machining conditions are changed from one set to another, in the order 07, 08, 09, 10, with each increment of movement $L_o$.

In accordance with the present invention as described and illustrated above, electric discharge machining can be carried out in an optimum fashion because the machining conditions are capable of being changed during the course of machining. The method of the invention is particularly effective for application to workpieces of varying thickness. In addition, there is no increase in cost because the sets of machining conditions are simply stored in memory and selected in response to a machining condition selection instruction read in from a storage medium such as a paper tape.

As many apparently widely different embodiments of the present invention can be made without departing from the spirit and scope thereof, it is to be understood that the invention is not limited to the specific embodiments thereof except as defined in the appended claims.

What is claimed is:

1. A wire-cut electric discharge machining method, using a control device with a data memory, for machining a workpiece in accordance with a command from the control device by moving a wire electrode relative to the workpiece along a commanded path and producing an electric discharge in a gap between the wire electrode and the workpiece, said method comprising the steps of:
    (a) storing, in advance, sets of different machining conditions in the data memory of the control device;
    (b) reading a machining condition selection instruction, specifying a final set of machining conditions, and a move command, specifying a traveling distance, from a machining program at the time that the workpiece is to be machined;
    (c) selecting a first set of machining conditions from the sets of machining conditions in response to a previously read machining condition selection instruction and performing electric discharge machining based on the first set of machining conditions as a current set of machining conditions for a first portion of the traveling distance;

(d) selecting a second set of machining conditions, different from the current set of machining conditions, the second set of machining conditions being adjacent to the current set of machining conditions and closer to the final set of machining conditions than the current set;

(e) performing electric discharge machining based on the second set of machining conditions as the current set of machining conditions for a second portion of the traveling distance; and (f) repeating steps (d) and (e) until the second set of machining conditions selected in step (d) is the final set of machining conditions, steps (d) and (e) being repeated at a rate which results in the traveling distance being fully traversed when the electric discharge machining based on the final set of machining conditions is completed.

2. A method according to claim 1, wherein said selecting step (c) comprises the step of changing machining conditions immediately upon reading the selected machining condition selection instruction from the data memory.

3. A wire-cut electric discharge machining method for machining a workpiece in accordance with a command from a control device, having a data memory, by moving a wire electrode relative to the workpiece along a command path and producing an electric discharge in a gap between the wire electrode and the workpiece, said method comprising the steps of:

(a) storing, in advance, in the data memory of the control device, sets of machining conditions differing in accordance with a variation in workpiece thickness;

(b) reading a move command, which specifies a traveling distance and direction, and a machining condition selection command in a machining program at the time that the workpiece is to be machined;

(c) selecting sets of machining conditions from the sets of machining conditions in response to the machining condition selection command; and (d) performing electric discharge machining for a continuous variation in workpiece thickness, changing from a first set of machining conditions to a second set of machining conditions, the second set being selected from among the sets of machining conditions as having machining conditions closest to the first set of machining conditions and closest to the machining conditions required to cut the workpiece at the time said changing occurs, said changing occuring for each increment of movement L/n, where n equals one plus the number of sets of machining instructions between a set of machining conditions designated by the machining condition selection instruction most recently read in step (b), and a set of machining conditions designated by the machining condition selection instruction read in step (b) immediately preceding the most recently read machining condition selection instruction, and where L is the traveling distance specified by the move command most recently read in step (b).

4. A method according to claim 3, wherein step (d) comprises, for a continuous variation in workpiece thickness, changing from the set of machining conditions designated by the machining condition selection instruction read in step (b) immediately preceeding the most recently read machining condition selection instruction to the first set of machining conditions after an increment of movement L/2n from a point at which the move command most recently read in step (b) is read.

5. A wire-cut electric discharge machining method for machining a workpiece by moving a wire electrode relative to the workpiece and producing an electric discharge in a gap between the wire electrode and the workpiece, the machining being controlled by a control device, having a data memory and an input device, in accordance with commands of different types, at least one of the types of commands having a mode, said method comprising the steps of:

(a) storing sets of machining conditions in the data memory by assigning a stage number to each of the sets of machining conditions;

(b) reading one of the commands in a machining program input via the input device;

(c) determining, in the control device, which of the types of commands was read in step (b);

(d) moving the wire electrode relative to the workpiece according to the one of the commands read in step (b) if the one of the commands read in step (b) was a move command;

(e) determining what mode the one of the commands read in step (b) has if the one of the commands read in step (b) was a machining condition selection command;

(f) reading at least one selected set of machining conditions in dependence upon the machining condition selection command;

(g) setting present machining conditions to the selected set of machining conditions immediately if the one of the commands read in step (b) was a first mode machining condition selection command;

(h) setting the present machining conditions to the selected set of machining conditions repeatedly, one stage number at a time, if the one of the commands read in step (b) was a second mode machining condition selection command;

(i) setting the present machining conditions to the selected set of machining conditions when the state of machining changes if the one of the commands read in step (b) was a third mode machining condition selection command; and (j) returning to step (b) after completing each of steps (d), (g), (h) and (i).

6. A wire-cut electric discharge machining method according to claim 5, wherein the control device includes pulse distributors and step (d) comprises the steps of:

(di) calculating a distance to be traveled;

(dii) computing incremental values;

(diii) applying the incremental values to the pulse distributors; and (div) performing the machining according to pulses distributed by the pulse distributors until the distance to be traveled has been traversed.

7. A wire-cut electric discharge machining method according to claim 5, wherein step (f) comprises the step of retrieving only one of the sets of machining conditions from the data memory as the selected sets, and wherein step (g) comprises applying the selected set of machining conditions to change the machining being performed.

8. A wire-cut electric discharge machining method according to claim 5, wherein step (i) comprises the steps of:
- (i1) reading a following move command following a most recently read machining condition selection command;
- (i2) sensing a change in the state of machining; and
- (i3) retrieving the selected set of machining conditions when the state of machining changes.

9. A wire-cut electric discharge machining method according to claim 8, wherein step (i2) comprises the step of monitoring discharge current.

10. A wire-cut electric discharge machining method according to claim 8, wherein step (i2) comprises the step of monitoring servo voltage.

11. A wire-cut electric discharge machining method for machining a workpiece by moving a wire electrode relative to the workpiece and producing an electric discharge in a gap between the wire electrode and the workpiece, the machining being controlled by a control device, having a data memory, and an input device under the control of commands of different types, at least one of the types of commands having a mode, said method comprising the steps of:
- (a) storing sets of machining conditions in the data memory by assigning a stage number to each of the sets of machining conditions;
- (b) reading a selected command in a machining program input via the input device;
- (c) determining, in the control device, which of the types of the commands was read as the selected command;
- (d) moving the wire electrode relative to the workpiece according to the selected command if the selected command is a move command;
- (e) determining, in the control device, the mode of the selected command if the selected command is a first mode, second mode or third mode machining condition selection command;
- (f) changing the machining conditions immediately if the selected command is the first mode machining condition selection command;
- (g) changing the machining conditions repeatedly, if the selected command is the second mode machining condition selection command, comprising the substeps of:
  - (gi) computing a number of stages by subtracting from the stage number of a most recently read machining condition selection command, the stage number of an immediately previously read machining condition selection command;
  - (gii) reading a following move command which follows the most recently read machining condition selection command;
  - (giii) calculating a distance to be traveled;
  - (giv) counting pulses to determine a distance traveled;
  - (gv) retrieving a next set of machining conditions when the distance traveled is a multiple of the distance to be traveled divided by the number of stages; and
  - (gvi) repeating steps (giv) and (gv) until the distance traveled equals the distance to be traveled;
- (h) changing the machining conditions when the state of the machining changes if the selected command is the third mode machining condition selection command; and
- (i) returning to step (b) after completing each of steps (d), (f), (g) and (h).

12. A wire-cut electric discharge machining method according to claim 11,
wherein step (gii) comprises the step of dividing the distance to be traveled by the number of stages to find a one-stage travelling distance,
wherein said step (giv) comprises the step of incrementing a register with the pulses, and
wherein said step (gv) comprises the steps of:
- (gv1) comparing the content of the register with the one-stage travelling distance;
- (gv2) retrieving the next set of machining conditions and resetting the register when the content of the register matches the one-stage travelling distance; and
- (gv3) applying the next set of machining conditions to change the machining being performed.

* * * * *

UNITED STATES PATENT AND TRADEMARK OFFICE
CERTIFICATE OF CORRECTION

PATENT NO. : 4,559,434
DATED : December 17, 1985
INVENTOR(S) : Kinoshita

It is certified that error appears in the above-identified patent and that said Letters Patent is hereby corrected as shown below:

```
Column 1, line 55, "set," should be --set--;
         line 58, delete "unattended op";
         line 59, delete "eration".
Column 3, line 16, "electorde" should be --electrode--.
```

Column 4, line 27, "$\sqrt{\Delta x^2 + \Delta y^2}$" should be --$\sqrt{\Delta x^2 + \Delta y^2}$--;
line 47, "respectively" should be --, respectively, --.
Column 5, line 20, "respectively" should be --respectively,--.

Column 6, line 20, "$\sqrt{\Delta x^2 + \Delta y^2}$" should be --$\sqrt{\Delta x^2 + \Delta y^2}$--;

Signed and Sealed this

Twenty-ninth Day of April 1986

[SEAL]

Attest:

DONALD J. QUIGG

Attesting Officer

Commissioner of Patents and Trademarks